United States Patent
Bachmann et al.

(10) Patent No.: US 8,848,668 B2
(45) Date of Patent: *Sep. 30, 2014

(54) NETWORK INITIATED CONTEXT ESTABLISHMENT

(75) Inventors: Jens Bachmann, Obersursel (DE); Rolf Hakenberg, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/535,787

(22) Filed: Jun. 28, 2012

(65) Prior Publication Data

US 2012/0263148 A1    Oct. 18, 2012

Related U.S. Application Data

(63) Continuation of application No. 13/359,299, filed on Jan. 26, 2012, now Pat. No. 8,233,441, which is a continuation of application No. 13/112,678, filed on May 20, 2011, now Pat. No. 8,134,975, which is a continuation of application No. 11/576,776, filed as application No. PCT/EP2005/007005 on Jun. 29, 2005, now Pat. No. 7,969,931.

(30) Foreign Application Priority Data

Oct. 6, 2004    (EP) ..................... 04023829

(51) Int. Cl.
*H04W 4/00* (2009.01)
*H04W 36/00* (2009.01)
*H04W 28/16* (2009.01)
*H04W 76/04* (2009.01)
*H04W 36/14* (2009.01)
*H04W 80/04* (2009.01)

(52) U.S. Cl.
CPC ........ *H04W 36/0038* (2013.01); *H04W 76/041* (2013.01); *H04W 36/14* (2013.01); *H04W 36/0011* (2013.01); *H04W 28/16* (2013.01); *H04W 80/04* (2013.01)
USPC ........................................... 370/331; 370/334

(58) Field of Classification Search
CPC . H04W 80/04; H04W 36/18; H04W 36/0011; H04W 36/14; H04W 36/08
USPC .................... 370/331, 334, 338, 328
See application file for complete search history.

(56) References Cited

U.S. PATENT DOCUMENTS

| | | |
|---|---|---|
| 6,978,128 B1 | 12/2005 | Raman et al. |
| 7,443,835 B2 | 10/2008 | Lakshmi Narayanan et al. |
| 7,616,598 B2 | 11/2009 | Chang et al. |
| 7,620,017 B2 | 11/2009 | Sayeedi et al. |
| 7,969,931 B2 | 6/2011 | Bachmann et al. |
| 2003/0103496 A1 | 6/2003 | Lakshmi Narayanan et al. |
| 2004/0017798 A1* | 1/2004 | Hurtta et al. .................. 370/352 |
| 2004/0033805 A1 | 2/2004 | Verma et al. |
| 2004/0097230 A1 | 5/2004 | Natarajan et al. |
| 2006/0135124 A1 | 6/2006 | Kaneko et al. |

FOREIGN PATENT DOCUMENTS

| | | |
|---|---|---|
| JP | 2003-18195 A | 1/2003 |
| JP | 2004-266331 A | 9/2004 |
| WO | 2004/023249 A2 | 3/2004 |
| WO | 2004/045224 A1 | 5/2004 |

OTHER PUBLICATIONS

3GPP TS 22.234 v6.2.0(Sep. 2004), 3rd Generation Partnership Project; Technical Specification Group Services and System Aspects; Requirements on 3GPP system to Wireless Local Area Network (WLAN) interworking (Release 6), pp. 1-13.

3GPP TR 22.934 v6.2.0, Sep. 2003, 3rd Generation Partnership Project; Technical Specification Group Services and System Aspects; Feasibility study on 3GPP system to Wireless Local Area Network (WLAN) internetworking (Release 6), pp. 1-30.

3GPP TS 24.234 v6.0.0, Sep. 2004, 3rd Generation Partnership Project; Technical Specification Group Core Network; 3GPP System to Wireless Local Area Network (WLAN) internetworking; User Equipment (UE) to network protocols; Stage 3 (Release 6), pp. 1-24.

3GPP TS 29.234 v6.0.0, Sep. 2004, 3rd Generation Partnership Project; Technical Specification Group Core Network; 3GPP System to Wireless Local Area Network (WLAN) internetworking; Stage 3 (Release 6), pp. 1-56.

3GPP TS 33.234 v6.2.1, Sep. 2004, 3rd Generation Partnership Project; Technical specification group services and systems Aspects; 3G Security; Wireless Local Area Network (WLAN) internetworking security (Release 6), pp. 1-76.

3GPP TS 23.060 V6.6.0, "General Packet Radio Service (GPRS); Service description; Stage 2 (Release 6)," Sep. 2004, pp. 1-212.

3rd Generation Partnership Project, 3GPP: "3rd Generation Partnership Project; technical specification group services and system aspects; 3GPP system to wireless local area network (WLAN) internetworking; system description (release 6)," 3GPP TS 23.234 v6.2.0, Sep. 2004, pp. 1-97, XP002319904.

3rd Generation Partnership Project, 3GPP: "3rd Generation Partnership Project; technical specification group services and system aspects; general packet radio service (GPRS); service description; stage 2 (release 6)," 3GPP TS 23.060 v6.6.0, Sep. 2004, XP002319905, pp. 46-51, pp. 134-136.

Aboba et al., "The Network Access Identifier," Network Working Group, Request for Comments: 2486, Category: Standards Track, Jan. 1999, pp. 1-8.

International Search Report Dated Sep. 1, 2005.

PCT International Search Report dated Sep. 1, 2005.

Japanese Office Action dated Feb. 8, 2011 with English translation.

Jaseemuddin, "An architecture for integrating UMTS and 802.11 WLAN networks," computers and communication, 2003, (ISCC 2003), Proceedings, eight IEEE int'l symposium on Jun. 30-Jul. 3, 2003, Piscataway, New Jersey, USA, IEEE, 2003, pp. 716-723, XP010646102, ISBN: 0-7695-1961-X.

* cited by examiner

*Primary Examiner* — Michael J Moore, Jr
*Assistant Examiner* — Siren Wei
(74) *Attorney, Agent, or Firm* — Seed IP Law Group PLLC

(57) ABSTRACT

The invention relates to a method for configuring a context for a connection delivering a packet data service to a mobile terminal via a target wireless access network. The mobile terminal is initially connected to an originating wireless access network and the packet data service may be provided to the mobile terminal via the originating wireless network. Moreover, the invention provides an authentication server, a packet data gateway and a packet data service support node which participate in the context configuration method. To provide a method that allows establishing connection for packet service delivery to a mobile terminal from a wireless access network, as for example a UMTS, as fast as possible the invention suggests to preconfigure service provision of the packet data service via the target wireless access network by establishing a context prior to the mobile terminal connecting to the target wireless access network.

9 Claims, 5 Drawing Sheets

NETWORK INITIATED CONTEXT ESTABLISHMENT

This is a continuation application of U.S. application Ser. No. 13/359,299 filed Jan. 26, 2012, which is a continuation of U.S. application Ser. No. 13/112,678 filed May 20, 2011, now U.S. Pat. No. 8,134,975 issued Mar. 13, 2012, which is a continuation of U.S. application Ser. No. 11/576,776 filed Oct. 3, 2007, now U.S. Pat. No. 7,969,931 issued Jun. 28, 2011, which is a national stage of PCT/EP2005/007005 filed Jun. 29, 2005, which is based on European Application No. 04023829.7 filed Oct. 6, 2004, the entire contents of each which are incorporated by reference herein.

FIELD OF THE INVENTION

The invention relates to a method for configuring a context for a connection delivering a packet data service to a mobile terminal via a target wireless access network. The mobile terminal is initially connected to an originating wireless access network and the packet data service may be provided to the mobile terminal via the originating wireless network. Moreover, the invention provides an authentication server, a packet data gateway and a packet data service support node which participate in the context configuration method.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

Another issue becoming more and more important for future mobile communication networks is the interworking between different access network technologies in heterogeneous networks.

It has been recognised that WLANs (Wireless Local Area Networks) are, and will continue to be deployed by independent operators and that these WLANs may or may not be interworked with a mobile communication systems, such as 3GPP systems. Further, these WLANs may overlap partially or completely with WLANs that are interworked with Home and/or Visited mobile communication systems. Lastly, WLANs interworked with Home and Visited 3GPP systems may also overlap each other, as well as the radio access networks for each mobile communication system. These situations create multiple permutations of coverage areas and service states which will need to be carefully understood and managed.

In this respect the 3GPP has standardized the interworking of 3G networks and WLAN (see 3GPP TR 22.934: "Feasibility study on 3GPP system to Wireless Local Area Network (WLAN) interworking", 3GPP TS 22.234: "Requirements on 3GPP system to Wireless Local Area Network (WLAN) interworking" and 3GPP TS 23.234: "3GPP system to Wireless Local Area Network (WLAN) interworking; System Description", all available at http://www.3gpp.org).

There are number of different possible operating environments where interworking of the 3GPP system and the WLANs may be desired. The 3GPP operates universally in Public, Corporate, or Residential environments. WLANs may also be deployed in any of these environments and it would be advantageous if the standards for 3GPP to WLAN interworking could accommodate all of these environments. Such capability would further enhance the ease of use for the mobile system user and virtually extend the effective coverage areas of each system.

The different environments may involve different administrative domains and wide diversity of WLAN technical capabilities. As an example, the security capabilities and policies may differ between public, corporate and residential WLANs. These differences may lead to different interworking methods between 3GPP and WLANs.

Different scenarios are identified describing different levels of interworking. E.g. scenario 2 describes 3GPP-based access control and charging, scenario 3 relates to accessing 3GPP packet switched (PS) based services, e.g. IP Multimedia Subsystem (IMS), scenario 4 and 5 consider the access to 3GPP PS based services with service continuity.

The protocol details are separated in several documents. In 3GPP TS 24.234: "3GPP system to Wireless Local Area Network (WLAN) interworking; UE to Network protocols" the details of the protocols between WLAN UE and the network are described. In 3GPP TS 29.234: "3GPP system to Wireless Local Area Network (WLAN) interworking; Stage 3 Description" protocols for several network reference points are specified and in 3GPP TS 33.234: "Wireless Local Area Network (WLAN) interworking security" the security architecture, i.e. trust model and security requirements for the interworking of the 3GPP System and WLAN Access Networks are discussed.

The details of the WLAN Access Authentication and Authorization procedure from the architectural view are described in chapter 7.2 of 3GPP TS 23.234 and the W-APN (WLAN Access Point Name) Resolution and Tunnel Establishment in chapter 7.9 of 3GPP TS 23.234.

The description of the GPRS architecture with its entities and functionalities can be found in 3GPP TS 23.060: "General Packet Radio Service (GPRS); Service Descriptions; Stage 2". Especially the logical architecture in chapter 5.4, the GPRS attach procedure in chapter 6.5, the mobility management states in chapter 6.1.2, the location management procedures in chapter 6.9.2, the Packet Data Protocol (PDP) context activation procedure in chapter 9.2 and the appropriate HLR GPRS subscription data, MM and PDP contexts in chapter 13 are explained.

If a terminal hands over from a 3G network to WLAN and is afterwards in idle mode in 3G network. The terminal has to send periodic Routing Area Update (RAU) messages over the 3G air interface to preserve the MM and PDP contexts in the 3G Serving GPRS Support Node (SGSN). This requires the availability of 3G network coverage and a periodic 3G connection establishment for performing the RAU. If 3G network coverage is not available (user is in a shopping centre, at airport, in the subway) and the routing area (RA) update timer expires, the MM and PDP contexts are deleted in the SGSN. Further the 3G network connection establishment for performing the RAU would increase 3G signalling overhead and User Equipment (UE) power consumption.

In addition, if the terminal starts a 3G service from WLAN coverage, there is no PDP context established in the appropriate 3G SGSN. Thus if handover from WLAN to 3G is initiated the 3G connection for the service must be initiated from scratch by performing and GPRS Attach procedure and a PDP Context Activation which are time consuming and imply a significant delay for service delivery through the 3G network.

SUMMARY OF THE INVENTION

There is therefore a need to provide a method that allows establishing connection for packet service delivery to a mobile terminal from a wireless access network, as for example a UMTS, as fast as possible.

According to one embodiment of the invention a method for configuring a context for a connection delivering a packet data service to a mobile terminal via a target wireless access network is provided. The mobile terminal is initially connected to an originating wireless access network and the packet data service may be provided to the mobile terminal via the originating wireless network.

The authentication server may attach the mobile terminal to a core network connected to the target wireless access network to enable a reception of the packet data service via the target wireless access network. Further, the authentication server may initiate the establishment of a context within the core network connected to the target wireless access network wherein the context is established prior to an attachment of the mobile terminal to the target wireless access network.

This operation allows to set-up and configure parameters associated for packet data service delivery through the target wireless access network by establishing a context within one or more network nodes within the core network connected to the target wireless access network. Upon handover from the originating wireless access network to the target wireless access network, the user of the mobile terminal may benefit from the preconfiguration by a faster establishment of packet data service provision through the target wireless access network.

According to a further embodiment the authentication server may determine an address of a serving packet data service support node of the core network, wherein the serving packet data service support node serves the mobile terminal when attaching to the target wireless access network. Moreover, the attachment of the mobile terminal to the target wireless access network comprises sending a packet data service attach message to the serving packet data service support node.

In a variation of this embodiment the mobile terminal may be authenticated at the authentication server and receiving location information of the mobile terminal may be received at the authentication server, for example during the authentication procedure. The determination of the serving packet data service support node may comprise a mapping of the mobile terminal's location information to an identifier of the serving packet data service support node.

In another embodiment of the invention the context is a PDP context and/or MM context, the originating wireless access network is a WLAN, the target wireless access network is a UMTS or GSM (Groupe Special Mobile) radio access network and the packet data service is a GPRS service.

According to another embodiment of the invention the establishment of the context in the core network connected to the target wireless access network comprises the following steps. A packet data gateway of a core network connected to the originating wireless access network may receive an address of the serving packet data service support node or an address of a gateway packet data service support node of the core network connected to the target wireless network from the authentication server. The packet data gateway may further determine context information based on the context information associated to a connection used for providing the packet data service to the mobile terminal via the originating wireless access network, and may transmit a context activation message comprising the determined context information to the serving or gateway packet data service support node to establish the context in the respective packet data service support node. The packet data gateway relays packets of the packet data service to/from the originating wireless access network.

In one embodiment of the invention, the core network connected to the originating wireless access network and the core network connected to the target wireless access network is a core network common to the target and the originating wireless access network.

Further, in another embodiment of the invention the authentication server may determine the address of the gateway packet data service support node based on the access point name of an access point in the core network connected to the originating wireless access network communicating via an air interface with the mobile terminal.

In further embodiment, the a context activation message comprising the context information from the serving/gateway packet data service support node may be transmitted to the gateway/serving packet data service support node to establish the context at the respective packet data service support node.

For example, the context may comprise QoS requirement for delivery of the packet data service and resource reservation information for reserving resources in the core network connected to the target wireless access network and/or the target wireless access network for delivery of the packet data service. According to this example, the packet data gateway may determine resource reservation information based on the context information associated to a connection used for providing the packet data service to the mobile terminal via the originating wireless access network, and may transmit the determined resource reservation information within the context activation message to the serving or gateway packet data service support node to reserve resources within the core network connected to target wireless access network and/or the target wireless access network for delivery of the packet data service prior to an attachment of the mobile terminal to the target wireless access network.

In a variation of this example the authentication server may indicate to the packet data gateway whether to reserve resources for delivery of the packet data service.

According to a further embodiment of the invention, a service request for delivery of the packet data service is received from the mobile terminal through the target wireless access network by the serving packet data service support node, and the packet data gateway may be requested to route data of the packet data service to the mobile terminal via the core network connected to the target wireless access network and the target wireless access network.

In a variation of this embodiment, the request to the packet data gateway comprises the transmission of a context update message from the serving packet data service support node to the gateway packet data support node.

Another embodiment of the invention foresees that the packet data gateway and the gateway packet data support node are comprised within one core network element.

In a further embodiment the request mentioned above is a request for resources for delivery of the packet data service through the target wireless access network.

Further, in a variation of the embodiment, a rerouting request message may be transmitted from the gateway packet data support node to the packet data gateway to request the routing of data of the packet data service to the mobile terminal via the target wireless access network.

Another embodiment of the invention relates to an authentication server for initiating the establishment of a context for a connection delivering a packet data service to a mobile terminal via a target wireless access network. As before, the mobile terminal is initially connected to an originating wireless access network and is provided with a packet data service through the originating wireless access network. The authentication server may comprise a communication means for attaching the mobile terminal to a core network connected to the target access wireless network to enable a reception of the packet data service via the target wireless access network, and for initiating the establishment of a context within a core network connected to the target wireless access network. According to this embodiment, the authentication server is adapted to initiate the context establishment prior to an attachment of the mobile terminal to the target wireless access network.

In another embodiment of the invention the authentication server further comprises means adapted to perform the steps of the method according to one of the various embodiments outlined above.

Further, one embodiment of the invention relates to a packet data gateway for initiating the establishment of a context for a connection delivering a packet data service to a mobile terminal via a target wireless access network. Again, the mobile terminal is initially connected to an originating wireless access network and is provided with a packet data service through an originating wireless access network connected to the packet data gateway.

The packet data gateway may comprise communication means for receiving an address of the serving packet data service support node or an address of a gateway packet data service support node within the core network connected to the target wireless access network from an authentication server. Moreover the packet data gateway includes processing means for determining context information based on the context information associated to a connection used for providing the packet data service to the mobile terminal via the originating wireless access network. The communication means may be adapted to transmit a context activation message comprising the determined context information to the serving or gateway packet data service support node to establish a context in the core network connected to the target wireless access network prior to an attachment of the mobile terminal to the target wireless access network.

Another embodiment of the invention relates to the packet data gateway which further comprises means adapted to perform the method according to one of the various embodiments outlined above.

One other embodiment of the invention foresees a packet data service support node in a core network connected to a target access network for configuring a context for a connection delivering a packet data service to a mobile terminal via the target wireless access network. The mobile terminal is initially connected to an originating wireless access network and is provided with a packet data service through an originating access network connected. According to this embodiment the packet data service support node comprises communication means for receiving a packet data service attach message from an authentication server and processing means for attaching the mobile terminal to a core network connected to the target wireless access network in response to the packet data service attach message to enable a reception of the packet data service through the target wireless access network: Further the communication means is adapted to receive a context establishment request comprising context information from a packet data gateway and the processing means is adapted to establish the context based on the context information prior to an attachment of the mobile terminal to the target wireless access network.

The packet data service support node according another embodiment of the invention further comprises means adapted to perform the steps of the method according to one of the various embodiments outlined above.

Other embodiments of the invention relate to the implementation of the different embodiment of the invention in software. According to one of these embodiments, a computer readable medium for storing instructions that, when executed by a processor of an authentication server, cause the authentication server to initiate the establishment of a context for a connection delivering a packet data service to a mobile terminal via a target wireless access network is provided. The mobile terminal is initially connected to an originating wireless access network and is provided with a packet data service through the originating wireless access network.

The authentication server may be caused to initiate the establishment of the context by attaching the mobile terminal to a core network connected to the target wireless access network by the authentication server to enable a reception of the packet data service via the target wireless access network, and initiating the establishment of a context within a core network connected to the target wireless access network, wherein the context establishment is initiated prior to an attachment of the mobile terminal to the target wireless access network.

In another embodiment of the invention, the computer readable medium further stores instruction that, when executed by the processor of the authentication server, cause the authentication server to perform the steps of the method according to one of the various embodiments outlined above.

Further, one embodiment of the invention relates to a computer readable medium for storing instructions that, when executed by a processor of a packet data gateway, cause the packet data gateway to initiating the establishment of a context for a connection delivering a packet data service to a mobile terminal via a target wireless access network. The mobile terminal is initially connected to an originating wireless access network and is provided with a packet data service through an originating wireless access network connected to the packet data gateway.

The packet data gateway may be caused to initiate the context establishment by receiving an address of the serving packet data service support node or an address of a gateway packet data service support node within the core network connected to the target wireless access network for an authentication server, determining context information based on the context information associated to a connection used for providing the packet data service to the mobile terminal via the originating wireless access network, and transmitting a context activation message comprising the determined context information to the serving or gateway packet data service support node to establish a context in core network connected to the target wireless access network prior to an attachment of the mobile terminal to the target wireless access network.

The computer readable according to another embodiment of the invention may further store instruction that, when executed by the processor of the packet data gateway, cause the packet data gateway to perform the method according to one of the various embodiments outlined above.

A further embodiment of the invention encompassed a computer readable medium for storing instructions that, when executed by a processor of a packet data service support node, cause the packet data service support node in a core network connected to a target access network to configure a context for a connection delivering a packet data service to a mobile terminal via the target wireless access network. As before, the mobile terminal is initially connected to an originating wireless access network and is provided with a packet data service through an originating wireless access network.

The packet data service support node may be caused to configure the context by receiving a packet data service attach message from an authentication server, attaching the mobile terminal to the core network connected to the target wireless access network in response to the packet data service attach message to enable a reception of the packet data service via the target wireless access network, receiving a context establishment request comprising context information from a packet data gateway and establishing the context base on the context information prior to an attachment of the mobile terminal to the target wireless access network.

In another embodiment the computer readable medium further stores instruction that, when executed by the processor of the packet data service support node, cause the packet data service support node to perform the steps of the method according to one of the various embodiments outlined above.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to a UMTS communication system interworking with a WLAN. Also the terminology used in the subsequent sections mainly relates to the UMTS terminology and WLAN terminology. However, the used terminology and the description of the embodiments with respect to the UMTS to WLAN interworking architecture is not intended to limit the principles and ideas of the inventions to such systems.

Also the explanations given in the Technical Background section above are merely intended to better understand the mostly UMTS and WLAN specific exemplary embodiments described in the following and should not be understood as limiting the invention to the described specific implementations of processes and functions in the mobile communication network or WLAN.

One main aspect of the invention is to enable an authentication server to initiate the establishment of a context in a target network for a packet data service while the mobile terminal is connected to the originating network and receives the packet service through this originating network.

For exemplary purposes the following case may be considered. If the terminal has WLAN coverage and an activated 3G service over WLAN, the appropriate 3G SGSN may be determined by the AAA (Authentication, Authorization, and Accounting) server by the use of location information and a mapping function. The AAA performs the GPRS Attach and Routing Area Update and initiates the PDP Context Activation on behalf of the terminal before the terminal connects to the 3G network. This reduces 3G signalling overhead and terminal power consumption and further does not depend on 3G coverage.

Figure 1:
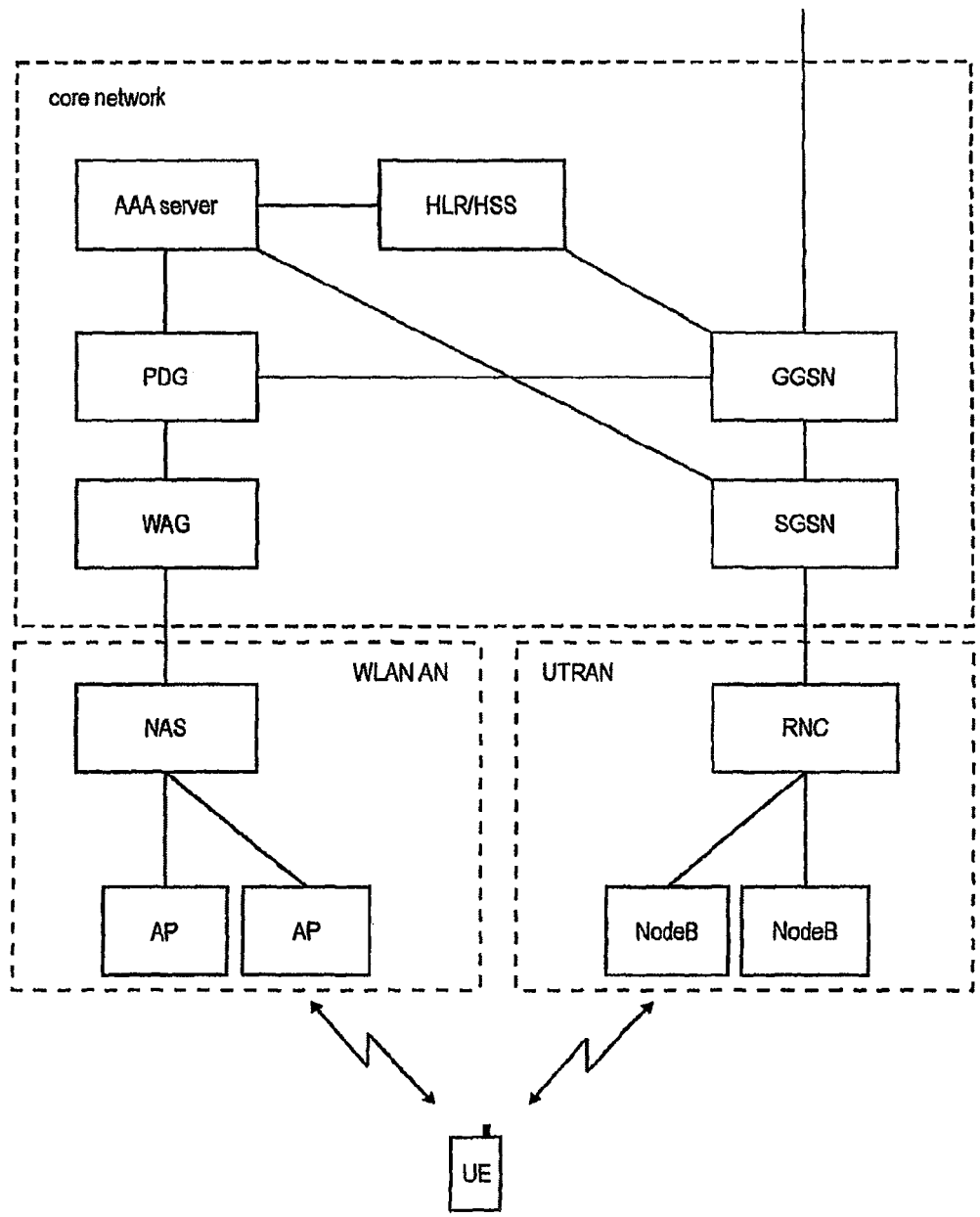
FIG. 1 shows an architecture for a 3GPP system to WLAN interworking supporting a handover of mobile terminals between the heterogeneous networks.

A possible architecture for 3GPP system to WLAN interworking with handover support is shown in FIG. 1. In addition to the current 3GPP system to WLAN interworking architecture for scenario 2 and 3, this architecture comprises an interface between the packet data gateway (PDG) and the GGSN for routing/relaying data packets from the Gateway GPRS Support Node (GGSN) to the PDG and vice versa. It should be noted that the functionality of the PDG is to a large extend similar to the one of the GGSN.

Further an interface between an authentication server, according to the exemplary architecture an AAA Server and the SGSN to establish the MM (Mobility Management) and PDP (Packet Data Protocol) context for a user is included.

For a 3GPP/WLAN dual mode mobile terminal it is possible to access 3G services from an active 3G connection and also from an active WLAN connection.

In one embodiment of the invention the mobile terminal may perform a GPRS attach procedure in the 3G network in order to access GPRS services. After completing the GPRS attach procedure the mobile terminal is in the so-called "PMM connected state" and the MM context may be created in the SGSN. This context may inter alia comprise the IMSI of the user, the current MM state and the Routing Area that identifies one or several cells of the mobile terminal's current location. The routing area identifier (RAI) may be broadcasted to the mobile terminals in RRC Idle mode and mobile terminals in RRC Connected mode may be notified on established RRC (Radio Resource Control) connections.

If the user wants to start a 3G service (e.g. SMS, MMS, IMS) on its terminal, a service activation may be initiated by the PDP context activation procedure. In the PDP context activation procedure, the Access Point Name (APN) and the requested QoS is signaled. The APN may identify the GGSN, the Packet Data Network and optionally a service to be offered. If the PDP context activation is accepted, a PDP context is established for example in the SGSN and the GGSN and PDP PDUs (Protocol Data Units) can be transferred between the mobile terminal and the GGSN.

If the mobile terminal has established a 3G service and detects WLAN coverage by scanning of WLAN beacons each WLAN beacon comprising a SSID identifying the respective WLAN, the handover from 3G to WLAN could be advantageously in terms of higher data rates and lower delay. The mobile terminal may for example select one of the available WLANs based on the received SSIDs.

Further the mobile terminal could be provided with a list of preferred WLANs which may be used to a WLAN in case more than one beacon is received by the mobile terminal. The mobile terminal may establish a connection with the target wireless access network, i.e. the chosen WLAN. This connection establishment to the WLAN is also referred to as the mobile terminal associating to the WLAN.

After associating to the WLAN, the mobile terminal may need to be authenticated in the WLAN. For example the WLAN Access Authentication (Re-authentication) may be initiated for this purpose. During this WLAN Access Authentication procedure EAP (Extensible Authentication Protocol) messages are commonly exchange between the mobile terminal, the WLAN access network (AN) and the 3GPP AAA Server. For the authentication of the user the user identity may be provided to the AAA Server in a NAI format (NAI=Network Access Identifier; see RFC 2486: "The Network Access Identifier", available at http://www.ietf.org) in the EAP messages.

It should be noted that the mobile terminal is commonly assigned an IP address within the WLAN after being authenticated. Therefore, the mobile terminal does not yet have an IP Address assigned which implies that the WLAN should support means to transport AAA messages from the mobile terminal to an AAA Server. On WLAN side specific means as e.g. specified by the WLAN standards IEEE 802.111 could be used. The transport of EAP messages from the WLAN access network to the AAA Server could be accomplished over RADIUS or Diameter.

When transporting EAP messages via RADIUS or Diameter an identifier of the WLAN access network is included in the messages. This identifier can for example be included implicitly by including the optional sender IP address of the Network Access Server (NAS-IP) serving as a RADIUS client for the mobile terminal to a RADIUS message. Alternatively, the WLAN access network identifier may also be included explicitly, for example by including the WLAN access point's MAC address (link identifier) or the access router's address (APID) to an EAP message by the mobile terminal or by an entity in the WLAN access network.

For service activation in a WLAN, the W-APN resolution and Tunnel establishment procedure for setting up a tunnel between the UE and the PDG is performed. For the Tunnel QoS setup, i.e. the setup of the tunnel QoS parameters, the QoS requirements may be either directly included in the establishment messages or the QoS signalling may be performed independently before or after the tunnel establishment. Further, the PDG could also determine the QoS requirements on basis of the specified service.

An identifier of the WLAN Access Network may also be included in the messages exchanged between MS and PDG during tunnel establishment. For example, the WLAN AN identifier may be included explicitly, for example the 3G RAI, the AP MAC address (link identifier), a notified AR address (APID), a GPS retrieved position or the transport IP address assigned to the MS in the WLAN access network is included to the messages by the MS or by an entity in the WLAN AN. This identifier may for example be transmitted during the authentication and authorization check from the PDG to the AAA Server.

After tunnel establishment and QoS setup the GGSN is triggered to route/relay the packets to the PDG and the PDG may tunnel the packets to the MS in WLAN. Please note that it is also possible that GGSN and PDG are physically located in one single network element. Further the 3G radio bearers to the MS may be released and the MS is moved to 3G idle mode.

As already indicated above, in case the terminal has to send periodic Routing Area Update (RAU) messages over the 3G air interface to preserve the MM and PDP contexts in the 3G SGSN, if 3G network coverage is not available (user is in a shopping centre, at airport, in the subway) and the RA update timer expires, the MM and PDP contexts may be deleted in the SGSN.

Also in case the MS activates a service in WLAN first, may result in a situation where the MS is not GPRS attached and has no PDP contexts established in the 3G network. Here the GGSN may not be involved in the delivery process of data packets to/from the MS, since the PDG may be directly connected to the external network or service provider as illustrated in FIG. 1.

Because WLAN coverage can get lost suddenly, it is of advantage to have faster service activation in the 3G network after/during handover from WLAN back to 3G. For this purpose one embodiment of the invention suggests to establish the PDP (and MM) contexts in the GGSN and SGSN in advance, i.e. before the MS attaches to the 3G network.

If the user is subscribed to support of seamless service handover between heterogeneous networks, e.g. from WLAN to 3G, the establishment of MM and PDP context in the Core Network nodes during WLAN connection can be performed in different levels. In dependence on the subscription level the user may be allowed to have no, low or full resource reservation for a packet data service delivery in the 3G without the MS being connected to the 3G network.

According to an embodiment of the invention the GPRS attach procedure and RA update is performed in case no resources have been reserved in the 3G network. Low reservation may mean that the PDP context is activated within the Core Network elements of the 3G network, but no QoS is negotiated, i.e. no resources (0 kbit/s) are reserved in the network for service delivery. In case of a 'full reservation' the PDP context may be activated, resources in the 3G network according to negotiated QoS parameters are reserved and optionally also RABs for service delivery may be setup before the MS is actually handing over to the 3G network.

In order to maintain the MM and PDP context in the SGSN and to keep the MS GPRS attached, a preservation function can be used. This function allows to preserve active PDP contexts in the SGSN for released radio bearers (which are released for example by the RAN because of a break of the radio connection) and to re-establish the radio bearers later. As outlined previously, this may require that periodic RA Updates are sent to the SGSN. Otherwise the mobile reachable timer in the SGSN expires and the GPRS detach procedure would be initiated for the MS. Alternatively, a special WLAN RAI may be sent from the MS to the SGSN so that the Timer controlling the duration of the activation is set to a very high value or the mobile reachable timer may even not be used, i.e. no timeout of MM and PDP contexts may be foreseen. However, this latter option may cause further problems in that e.g. all network elements activating a MM or PDP context would have to keep track of its deactivation as well.

For the transmission of RA Updates from the MS it is required that 3G coverage is available, that the MS is continuously listening to broadcast messages and that a RRC connection is established.

Figure 2:
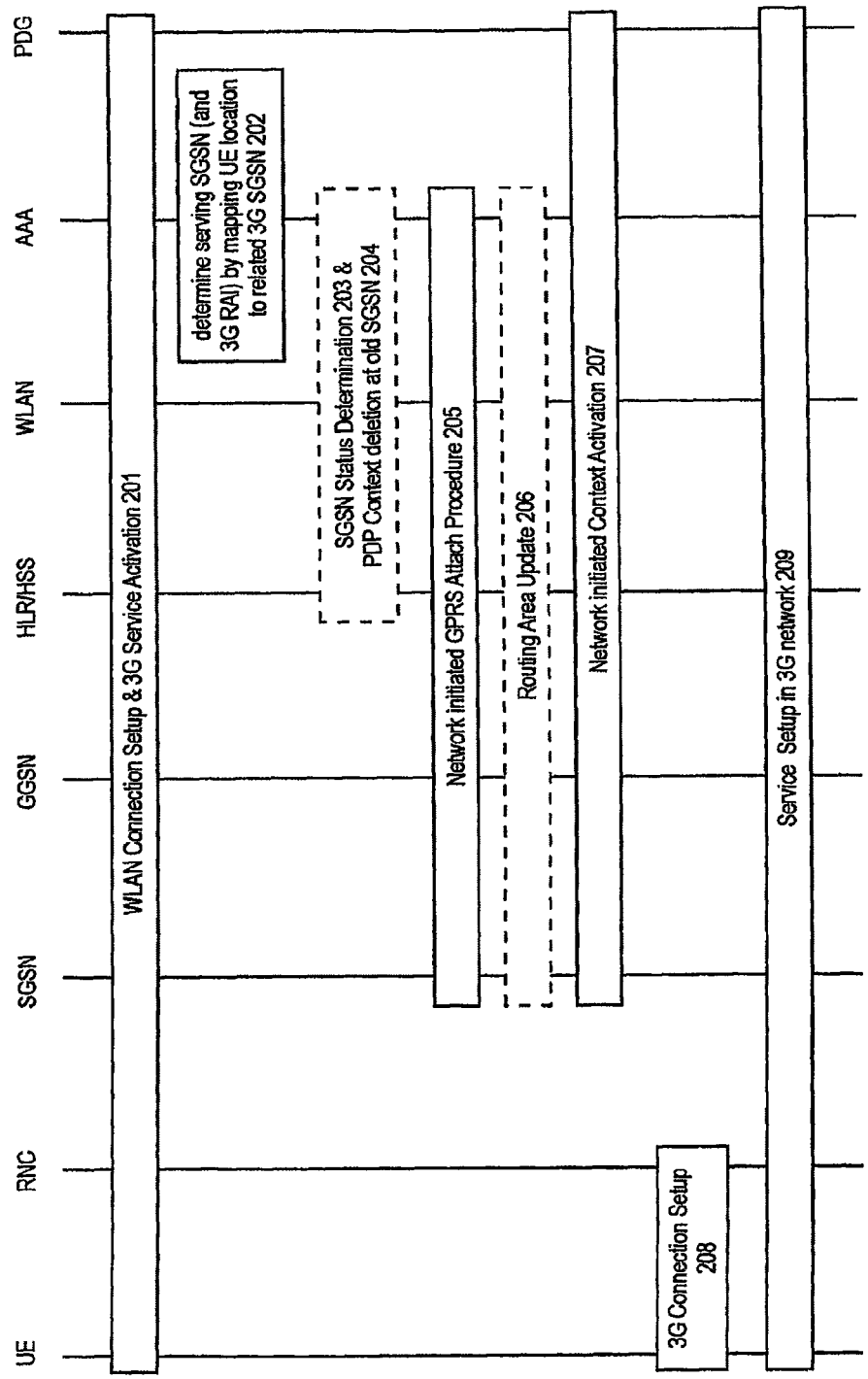
FIG. 2 shows a flow chart of a context establishment procedure according to an exemplary embodiment of the invention.

In one exemplary embodiment, it is assumed that the MS has an active WLAN connection and the AAA Server is informed about the current location of the MS (due to the implicitly/explicitly transmitted WLAN identifier). Thus, is no need for the MS to occupy 3G radio resources and to actively send messages on a 3G connection to preserve a state in the SGSN. This situation is for example depicted in FIG. 2 where the WLAN Connection Setup and 3G Service activation 201 is intended to exemplarily illustrate the connection of the MS to a WLAN and the activation of a GPRS service.

According to this embodiment, the AAA Server in the 3G network may have access to a location mapping function. This mapping function may be employed to determine 202 the possible SGSN serving the terminal when a handover to the 3G network would occur and the matching Routing Area in the 3G network in the same coverage of the current WLAN.

Every time the MS moves and changes the location, the AAA Server may be informed about the new location through an authentication procedure of the MS. When the location of the MS is changing, the AAA Server may determine the corresponding SGSN and RAI again and in case of a change the AAA Server may signal an update to the appropriate 3G network nodes.

Optionally the AAA Server may also check first if there is a SGSN registered for the MS within the HLR/HSS 203. If there is a registered SGSN that differs from the determined SGSN, the PDP contexts in that SGSN may be deleted 204. This check may be performed for example by the AAA server querying the HLR/HSS of the MS.

Figure 3:
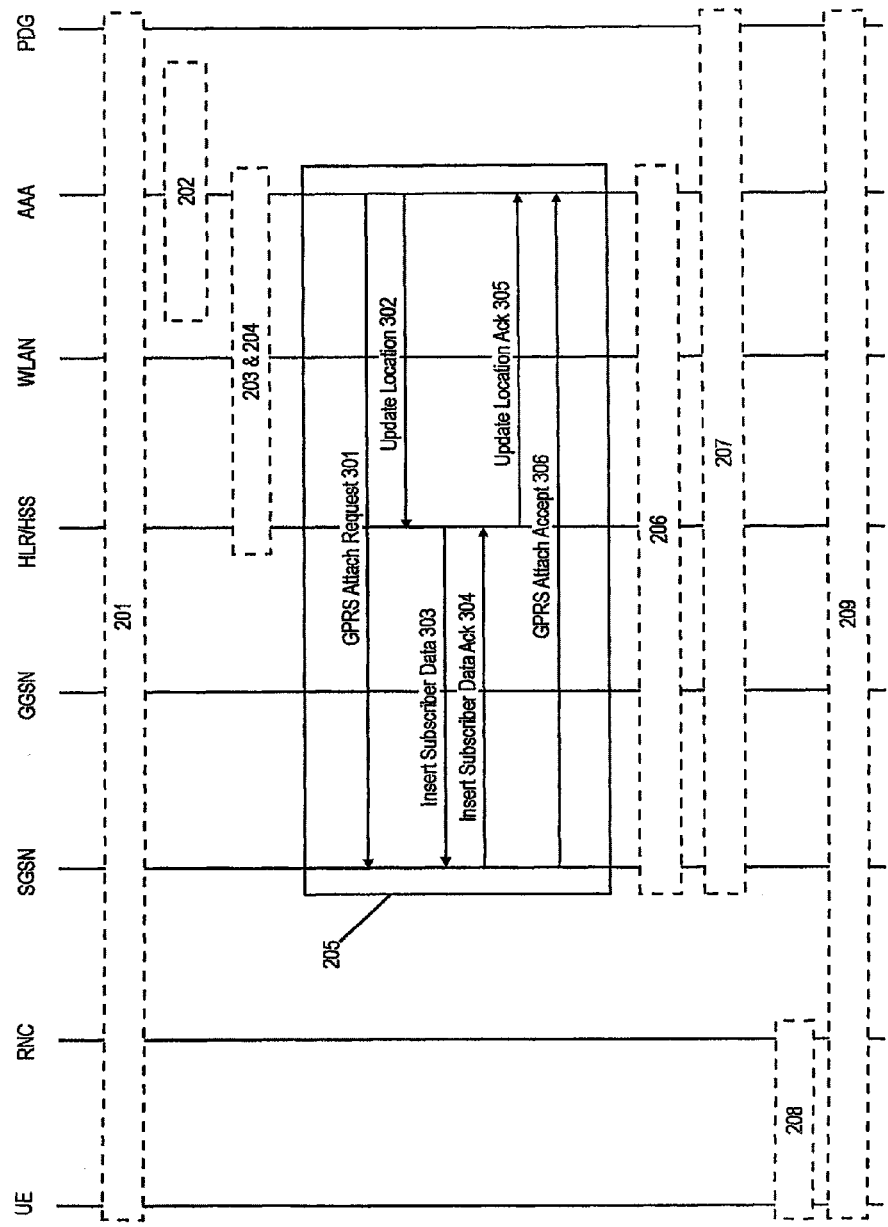
FIGS. 3 to 5 show details of different procedures indicated in the flow chart of a context establishment procedure as shown in FIG. 2 according different exemplary embodiments of the invention.

After determining the SGSN serving the coverage area of the WLAN in the 3G network, the AAA Server may initiate a GPRS attach procedure 205. An GPRS attach procedure according to an illustrative embodiment of the invention is shown in FIG. 3. In this exemplary procedure the AAA Server may transit 301 a GPRS attach message to the determined SGSN. Further, the AAA Server or the SGSN may update 302, 305 the location of the MS in the HLR/HSS and the HLR/HSS is triggered to send 303, 304 the subscriber data for the user to the SGSN. If the MS was already GPRS attached at this SGSN the messages may be ignored. Finally the network initiated GPRS attach is accepted 306 and the MM context is established in the SGSN.

After completion of the AAA Server initiated GPRS attach 205, the AAA Server may (optionally) perform a routing area update procedure 206. In this procedure, the AAA Server may send a routing area update to the SGSN in order to indicate to the SGSN to maintain the PDP and MM context for the UE. Furthermore the routing area update may be sent by the AAA Server every time the location of the MS in the WLAN changes such that the corresponding 3G RAI is also changing. Moreover, the AAA server may transmit routing area updates to the SGSN to restart the Routing Area Update Timer before expiry.

Figure 4:
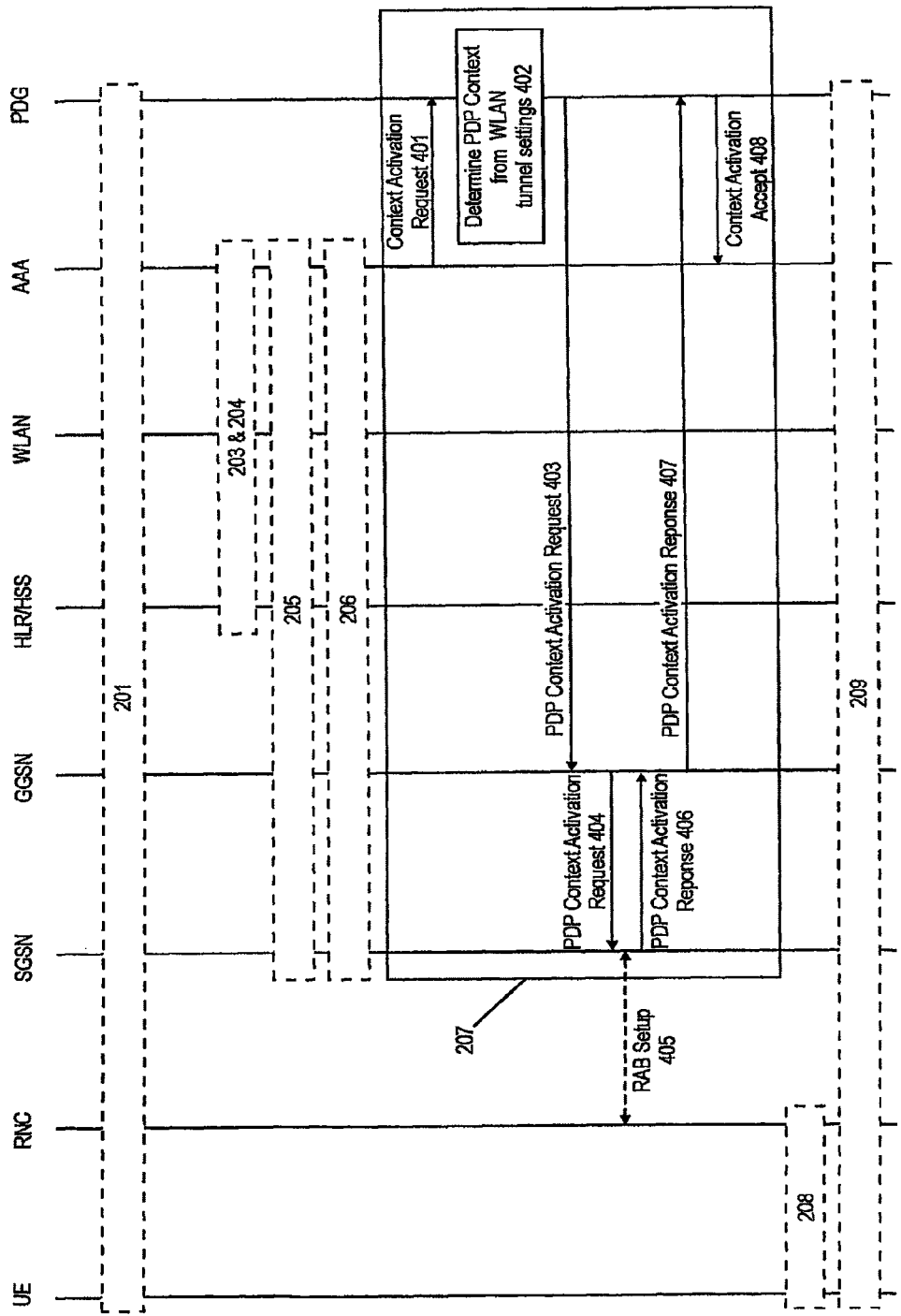

As mentioned above, the PDG may be informed on the service for the user and the QoS of the tunnel for the MS in WLAN. Next, the AAA Server may initiate 207 the PDP context establishment in the network nodes of the core network. An exemplary context establishment procedure 207 is illustrated in FIG. 4. The AAA Server may request 401 the PDG to activate PDP contexts related to the tunnels established for a user in the 3G network. For this purpose the PDG may determine 402 the PDP context parameters from the WLAN tunnel settings, such as the QoS parameters associated thereto. It should be noted that this context activation in the GSNs of the 3G network may not only based on the QoS parameters of the tunnel in the WLAN for the user but also based on the subscription level of the individual user.

Additional parameters for performing the PDP context activation may be included in the message (see 401) from the AAA Server to the PDG. The PDG may aggregate amongst others the IMSI, SGSN address, APN, PDP address, QoS Requested and QoS Negotiated in a request message and may send 403 the request to the GGSN to create and activate a PDP context. The GGSN's address may for example be determined by the PDG based on the APN received from the AAA Server. The GGSN may create a PDP context for the 3G idle user according to the received parameters and in addition a PDP context activation is initiated 404, 406 from the GGSN to the SGSN.

On reception of the PDP context activation message from the GGSN, the SGSN establishes the contexts for the user. Moreover, based on the I subscription level of the user the SGSN may optionally establish 405 RABs in the RAN for the user, i.e. may reserve resources for service provision to the user through the 3G network. Upon receiving 407 a PDP Context Activation Response message reporting on the context establishment, the PDG may inform 408 the AAA Server that the context has been established in the GPRS Support Nodes (GSNs).

Alternatively, the PDG may send the request message to the SGSN directly. The address of the SGSN may be made known to the PDG from the AAA server, which would no longer need to resolve the GGSN address from the APN in this case. The SGSN may create and activate the context(s) and may also trigger a context establishment at its SGSN.

If the mobile station (MS) loses WLAN coverage or if there is another trigger to handover the MS to the 3G network, a 3G radio connection will be (re-)established 208. Generally there may be the following three scenarios to consider in this respect.

If there are already RABs established in the RAN and resources for service provision have been reserved, only the radio bearers from the RAN to the MS must be set up which will further improve the performance of the handover between the heterogeneous networks.

Otherwise the MS may initiate a service request procedure to the SGSN to (re-)establishes RABs and radio bearers. In case the RABs and radio bearers have been configured and established before handover of the MS but no resources have been reserved in the core network, the PDP Context Modification procedure may be initiated to change the assigned QoS.

A third option may be that the RABs have been set up but no resources in the RAN have been reserved. In the network nodes of the core network a PDP context comprising reserved QoS and required QoS parameters may be established. If the reserved QoS parameters "reserve" no resources (0 kbit/s) this means that no resources are reserved within the core network but the PDP context is established in the network nodes. A similar mechanism may also be used in the RAN. Thus, in case of establishing RABs there may be no resources reserved in the RAN but a context associated to the RABs may be established prior to the MS attaching to the 3G network.

Figure 5:
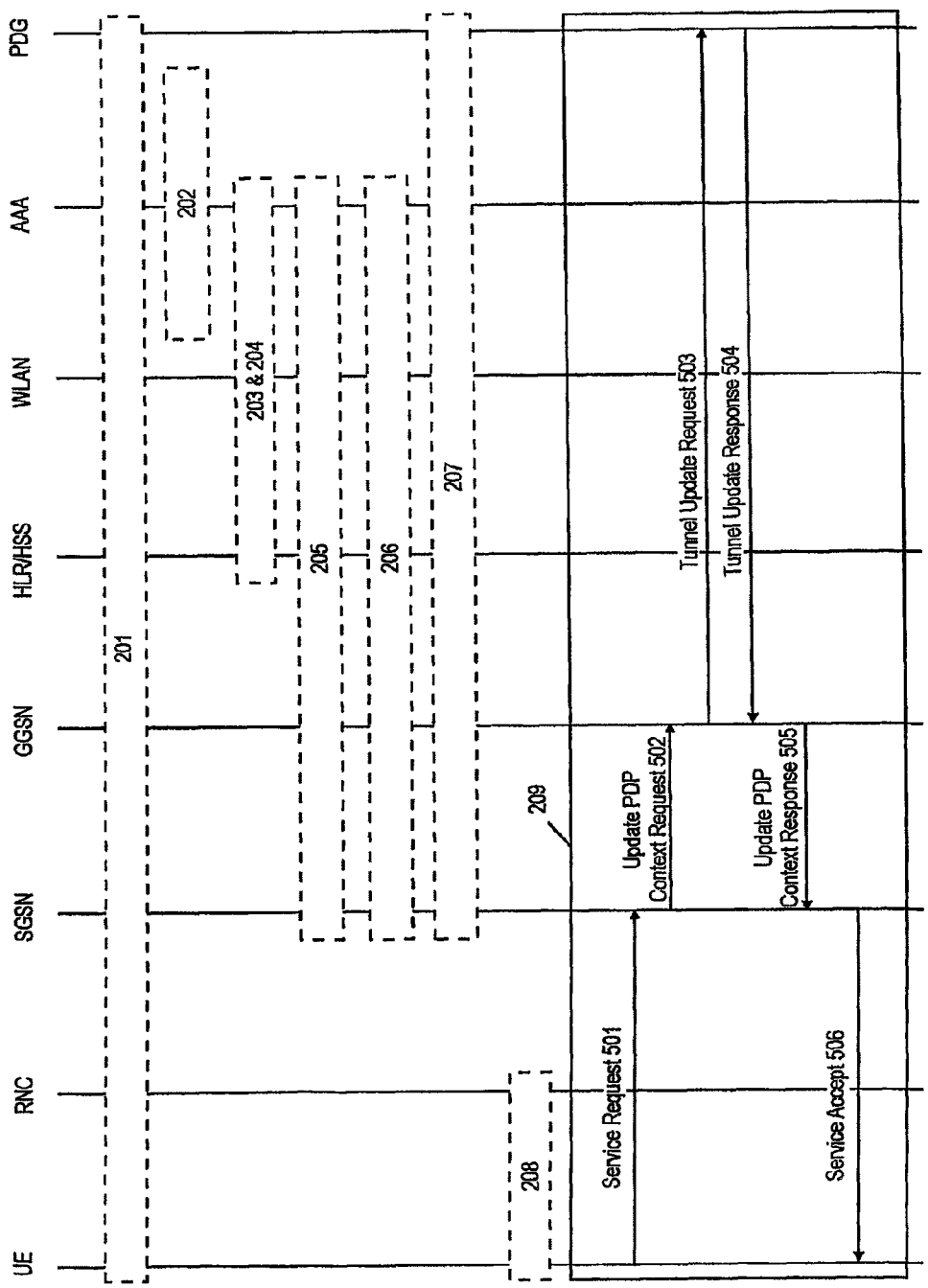

After completion of (or during) the 3G connection establishment 208, the MS may initiate a 3G Service Setup procedure 209. An exemplary procedure is shown inn FIG. 5. According to this procedure a Service Request 501 for a GPRS service is received by the SGSN. The SGSN may inform 502 the GGSN by a PDP Context Update Request that the MS desires to receive the GPRS service through the 3G network. This message may for example also be used to allocate resources in the 3G network for service delivery if not done previously, Upon receiving the message, the GGSN may send downlink packets to the SGSN.

For example, if the initial service activation procedure was directly to the PDG, the PDG may further be informed 503 to relay the packets to the GGSN and no longer to the downstream nodes in the WLAN. The messages exchanged between MS (UE), SGSN, GGSN and PDG may be confirmed or acknowledged 504, 505, 506 by respective messages.

Another embodiment of the present invention relates to the implementation of the above described various embodiments using hardware and software. It is recognized that the various above mentioned methods as well as the various logical blocks, modules, circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section.

The invention claimed is:

1. A method to enable handover of a mobile terminal between heterogeneous networks to a target wireless access network, wherein the mobile terminal is initially connected to an originating wireless access network, the method comprising the steps of:
   sending, by a packet data gateway, a request message to a service node, the request message requesting to create a context;
   creating, by the service node, the context, when the service node receives the request message;
   establishing, by the mobile terminal, a radio bearer between a control node and the mobile terminal in the target wireless access network; and
   sending, by the mobile terminal, through the target wireless access network, a service request message to the service node, the service request message initiating to update the context.

2. The method according to claim 1, wherein the context is created for the mobile terminal.

3. The method according to claim 1, wherein the service node initiates to create the context prior to establishment of the radio bearer.

4. The method according to claim 1, wherein the service node is a GPRS (General Packet Radio Service) support node.

5. The method according to claim 1, wherein the originating wireless access network is a WLAN (wireless local area network) and the target wireless access network is an UMTS (Universal Mobile Telecommunication System) wireless network.

6. The method according to claim 1, wherein the context is related to the mobile terminal.

7. A mobile terminal configured to perform handover between heterogeneous networks to a target wireless access network, wherein the mobile terminal is initially connected to an originating wireless access network, the mobile terminal comprising:
   an establishing unit configured to establish a radio bearer between a control node and the mobile terminal in a target wireless access network; and
   a sending unit configured to send, through the target wireless access network, a service request message to a service node, the service request message initiating to update the context created by the service node.

8. The mobile terminal according to claim 7, wherein the service node initiates to create the context prior to establishment of the radio bearer.

9. The mobile terminal according to claim 7, wherein the context is related to the mobile terminal.

* * * * *

UNITED STATES PATENT AND TRADEMARK OFFICE
CERTIFICATE OF CORRECTION

PATENT NO. : 8,848,668 B2  Page 1 of 1
APPLICATION NO. : 13/535787
DATED : September 30, 2014
INVENTOR(S) : Jens Bachmann et al.

It is certified that error appears in the above-identified patent and that said Letters Patent is hereby corrected as shown below:

In the Claims

Column 14, Line 17:
"network) and the target wireless access network is an UMTS" should read, --network) and the target wireless access network is a UMTS--.

Signed and Sealed this
Sixteenth Day of December, 2014

Michelle K. Lee
*Deputy Director of the United States Patent and Trademark Office*